May 30, 1967 R. R. NORLEY 3,322,998

COLOR PURITY CORRECTING APPARATUS FOR COLORED TELEVISION PICTURE TUBES

Filed Aug. 31, 1964

3 Sheets-Sheet 1

INVENTOR.
RONALD R. NORLEY

BY

W. H. Sprague
Attorney

May 30, 1967 R. R. NORLEY 3,322,998

COLOR PURITY CORRECTING APPARATUS FOR COLORED TELEVISION PICTURE TUBES

Filed Aug. 31, 1964 3 Sheets-Sheet 2

INVENTOR.
RONALD R. NORLEY
BY
W. H. Sponagle
Attorney

May 30, 1967 R. R. NORLEY 3,322,998

COLOR PURITY CORRECTING APPARATUS FOR COLORED TELEVISION PICTURE TUBES

Filed Aug. 31, 1964 3 Sheets-Sheet 3

INVENTOR.
RONALD R. NORLEY

BY W. H. Spongle
ATTORNEY 3,322,998

COLOR PURITY CORRECTING APPARATUS FOR COLORED TELEVISION PICTURE TUBES

Ronald Richard Norley, Indianapolis, Ind., assignor to Radio Corporation of America, a corporation of Delaware Filed Aug. 31, 1964, Ser. No. 393,200
11 Claims. (Cl. 315—8)

This invention relates to apparatus for degaussing television receivers and particularly to the electromagnetic structures usable in systems for automatically degaussing a cathode ray color picture tube.

The metallic mask and its supporting structure together with other metal parts used in conjunction with a shadow mask type of color television picture tube are subject to becoming magnetized both in shipment to, and continued use in, a consumer's home. Such magnetization is effected by bringing the picture tube into proximity with magnetizing structures such as trucks, elevators and the like and also by exposure during use to influences such as the earth's magnetic field. The resultant magnetic field from such random or other magnetization often adversely affects the performance of the color television receiver in which the picture tube is embodied. In the past the remedy for such magnetization has included a manual degaussing of the receiver, an operation usually performed by a serviceman. It also has been the experience of users of such a color television apparatus (receiver that the relocation or reorientation of the apparatus frequently required another degaussing in order to effect optimum performance in the new position.

It has been proposed previously to effect automatic degaussing of a color television picture tube by using the field neutralizing coil with which some prior art receivers were provided. Such a coil is wound around the picture tube in close proximity to the shadow mask and its supporting structure. When used for field neutralization purposes such a coil was energized with sufficient direct current to produce a magnetic field having a direction substantially parallel to the longitudinal axis of the tube. The magnitude and direction of the neutralization field was adjusted to be substantially equal and opposite to that component of the earth's magnetic field (frequently referred to the "Z" axis component) also extending substantially parallel to the longitudinal tube axis.

Such a "Z" axis component so undesirably influences the electron beams of the picture tube as to adversely affect color purity in the reproduced picture. By being in proximity to the outer edges of the picture tube the prior are field neutralizing coil was useful in maintaining satisfactory color purity in the reproduced picture by opposing the "Z" axis component. Once the direct current energization of the neutralizing coil was adjusted for one orientation of the television receiver relative to the earth's magnetic field, any different orientation of the receiver made it necessary to readjust the direct current energization of the coil. Additionally, such prior art neutralizing coils were not required to produce any substantial magnetic field in the central regions of the picture screen. For such reasons the additional alternating current energization of such a neutralizing coil for degaussing purposes, as previously suggested, is not satisfactory as a practical matter, particularly when relatively large sized picture tubes (such as 23 and 25 inch types) are involved.

It, therefore, is an object of the present invention to provide apparatus for a television picture tube which is susceptible of being conditioned to shield the electron beams of the tube from the influence of any extraneous magnetic field in which the tube may be placed regardless of the orientation of the tube in such a field.

A practical embodiment of the present invention includes a shield of permeable material which is shaped suitably to envelop the large end of the picture tube in which the viewing screen is housed and also at least a portion of the generally frusto-conical section of the picture tube which joins the large tube end to the small tube end in which the electron gun means is housed. In addition, the apparatus includes coil means which may be supported by the shield and which extend around the large end of the picture tube and which extend rearwardly toward the small end of the picture tube around the frusto-conical tube section. The shape of the shield and the described placement of the coil means relative to the tube are such that, when the coil means is energized by alternating current of a magnitude which initially is appreciable and which diminishes effectively to zero, the shield and associated magnetizable elements are left in such a state of magnetization as to effectively shield the electron beams of the picture tube from any external magnetizing influences present in the vicinity of the tube.

The invention is more fully described in the following specification taken in conjunction with the accompanying drawings, in which.

Figure 1:
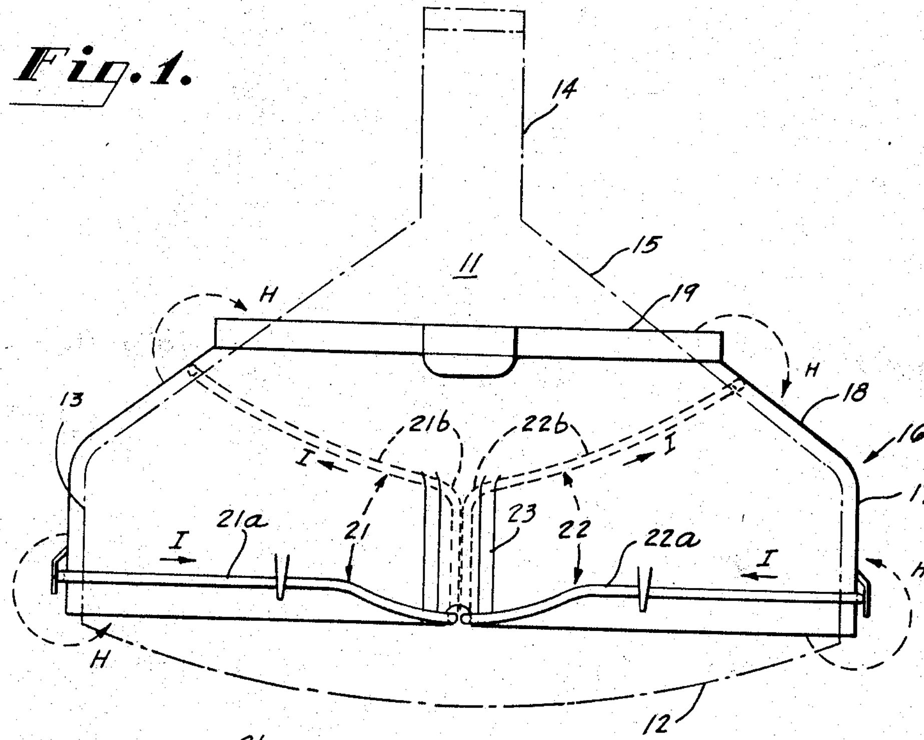
FIGURE 1 is a top view of the color purity correcting apparatus in a representative relationship to a color television picture tube.
Figure 3:
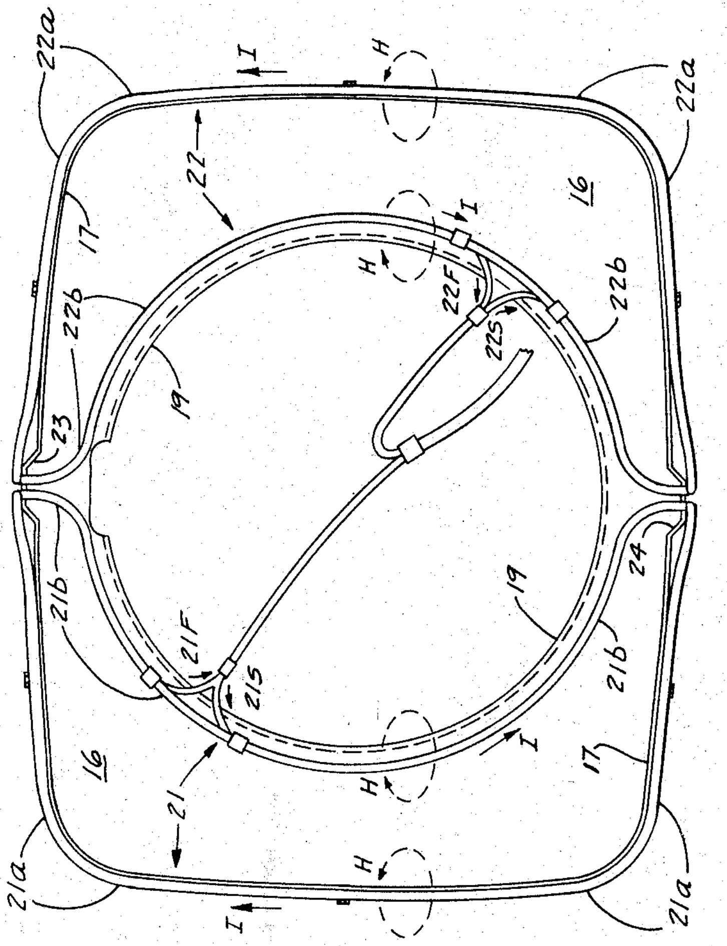
FIGURE 3 is a front view of such apparatus.
Figure 2:
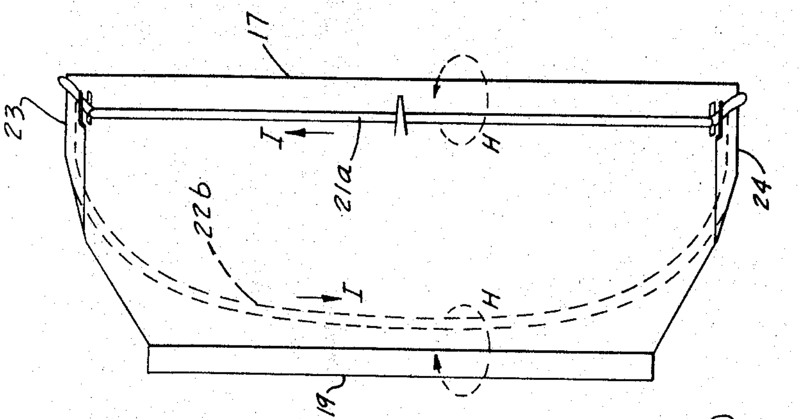
FIGURE 2 is a side view of such apparatus.

Reference first will be made to FIGURES 1, 2 and 3. The color picture tube 11, with which the color purity correcting apparatus embodying the present invention is adapted to cooperate, is of the shadow mask type. Approximately 21 inch diameter round viewing screen versions of this type of tube are used in most modern day color television receivers. In the present instance, the viewing screen 12 is substantially rectangular and has a diagonal dimension of about 23 or 25 inches. The screen is mounted in the relatively large end 13 of the picture tube 11. As in earlier versions of this type of picture tube suitable electron gun means are mounted in the relatively small end or neck 14 of the tube 11. It is considered that, in the interest of not unnecessarily complicating the drawings, there is no need in showing such known structure and hence, it is omitted from these figures. The large and small ends of the picture tube 11 are joined by means including a generally frusto-conical section 15. The picture tube 11 is supported in the television receiver cabinet by suitable means (now shown) such as by attachment to the front wall of the cabinet.

The color purity correcting apparatus embodying the present invention comprises a metallic shield of permeable material and coil means disposed appropriately relative to the shield to effect the desired demagnetization of the shield and associated magnetizable elements when the coil means is suitably energized. The shield 16 is formed of sheet steel (for example) into generally frusto-conical configuration and envelops a considerable portion of the picture tube 11. The forward end 17 of the tube shield 16 has a substantially rectangular configuration as viewed from the front of the television cabinet and envelops the large end 13 of the picture tube 11. The shield also has a rearwardly extending wall 18 of substantially frusto-conical shape terminating in a rear end 19 of generally circular shape. The shield thus envelops a substantial portion of the space inside of the picture tube 11 which is traversed by the electron beams in their travel from the electron gun means located in the small tube end 14 toward the viewing screen 12 in the large end 13 of the tube.

Associated with the shield 16 is a pair of coils 21 and 22, each including a plurality of bunched conductors. Each coil may have, for example, 75 to 100 turns. These coils are substantial duplicates, one being located on one side of the picture tube 11 and the other being located on the opposite of the picture tube and extending around the shield portion 17 in such a manner that sections of the two coils together completely surround the shield at its forward end 17. As shown, the substantially semi-rectangular front sections 21a and 22a respectively of the coils 21 and 22 are mounted on the outside of the shield 16. Channels 23 and 24 are formed centrally in the top and bottom portions respectively of the shield 16 by slightly deforming these portions of the shield. The channels are open at their forward ends and extend rearwardly toward the small end 14 of the picture tube 11. The rearwardly extending sections 21b and 22b of the coils 21 and 22 progress toward the rear end of the shield through the channels 23 and 24 and follow a path from top to bottom which partially encircles the frusto-conical section of the picture tube.

As shown particularly in FIGURE 3, these two coils are interconnected with one another and to an external source of energy, not shown, for excitation in a manner to be described. The start conductor 21S of coil 21 and the finish conductor 22F of coil 22 may be connected to the external energy source and the finish conductor 21F of coil 21 may be connected to the start conductor 22S of coil 22 to provide a series connection of the coils 21 and 22. It is to be noted that the coils 21 and 22 surround the forward portion 17 of the shield 16 on the outside of the shield and extend backwardly, partially encircling the frusto-conical section 15 of the tube 11 on the inside of the shield between it and the tube. Such a placement of the coils relative to the shield results in the desired demagnetization of the shield and associated magnetizable elements so that, irrespective of the orientation of the television receiver in which the described apparatus is housed, the metallic parts including the shield 16 are so magnetized after the coils 21 and 22 have been energized, as to effectively shield the electron beams inside of the picture tube 11 from any extraneous magnetizing influences including the various components of the earth's magnetic field. It is to be understood that the coils 21 and 22 alternatively may be connected in parallel, such as by connecting conductors 21S and 22S to one external source terminal and conductors 21F and 22F to the other source terminal.

There are indicated in FIGURES 1, 2 and 3 typical conditions obtaining at a given instant during the energization of the coils 21 and 22. The solid line arrows I indicate the instantaneous current flow through the coils 21 and 22 and the broken line arrows H indicate typical flux patterns created by such current flow at various points on the shield 16. It will be understood, of course, that at another instant the direction of current flow and the resulting flux patterns are oppositely oriented.

Figure 4:
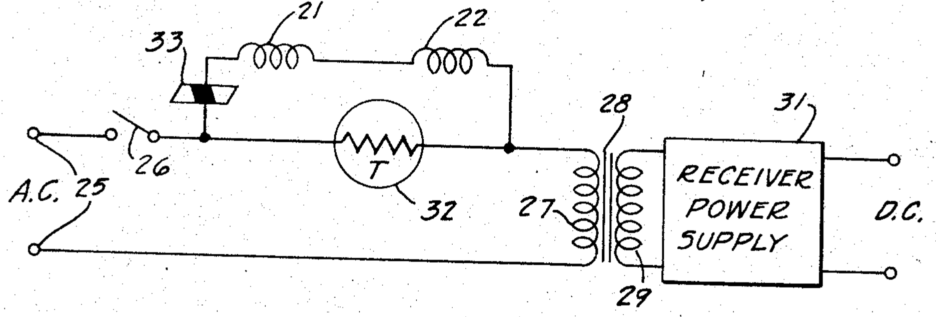
FIGURE 4 is a schematic circuit diagram of one arrangement by which the apparatus may be energized.

Reference now is made to FIGURE 4. The coils 21 and 22 are energized by alternating current derived from terminals 25 upon the closure of a switch 26. Such switch closure energizes the primary winding 27 of a transformer 28 so as to produce alternating current in the secondary winding 29 of the transformer. The secondary winding is connected to the power supply 31 for the television receiver by means of a circuit including a thermistor 32. The thermistor is a device which, when cool, has a relatively high resistance but, when hot, has a relatively low resistance. The coils 21 and 22 are energized by the voltage drop across the thermistor in a circuit which includes a voltage dependent resistor 33. The voltage dependent resistor is a device which has a relatively low resistance when a high voltage is impressed across it and a relatively high resistance when the impressed voltage is low. It will be observed that the resistive properties of the thermistor 32 and the voltage dependent resistor 33 are of a reciprocal nature.

The energization of the degaussing apparatus is as follows, assuming that the thermistor 32 is cold, i.e., at room temperature. Immediately upon closure of the switch 26, which conveniently is the on-off switch of the television receiver, the current flow through the thermistor 32 to the power supply 31 produces a relatively large voltage drop across the thermistor. At this time the resistance of the voltage dependent resistor 33 is low so that alternating current flows through the coils 21 and 22 of the degaussing apparatus at considerable amplitude. As a consequence, a relatively strong alternating magnetic field is produced within the picture tube 11 by the degaussing apparatus including the coils 21 and 22 and the shield 16. As the thermistor 32 warms in response to current flow therethrough its resistance decreases, thereby decreasing the voltage drop thereacross and the amplitude of the alternating current applied to the flux generating coils. As a result of the decreased voltage the resistance of the voltage dependent resistor 33 increases, thereby decreasing the current flow through the 21 and 22 coils. As a consequence, the strength of the alternating magnetic field produced by the degaussing apparatus decreases at a rate determined by the characteristics of the thermistor 32, the voltage dependent resistor 33, the alternating current voltage and the receiver load. The thermistor 32 ultimately heats sufficiently that its resistance and the voltage drop thereacross are very small. The resultant voltage applied to the voltage dependent resistor 33 is so small that the current through it and the coils 21 and 22 is of negligible value. Full alternating current voltage is applied to the receiver power supply 31 enabling it to supply the direct current for the operation of the television receiver. The coils 21 and 22, being effectively deenergized, produce no further significant magnetic field within the picture tube. At this point the metallic structures of the color picture tube 11 and associated magnetic elements are effectively demagnetized. The shield 16, thereafter, functions only to provide a shielding effect from the earth's and other undesired magnetic fields.

Figure 5:
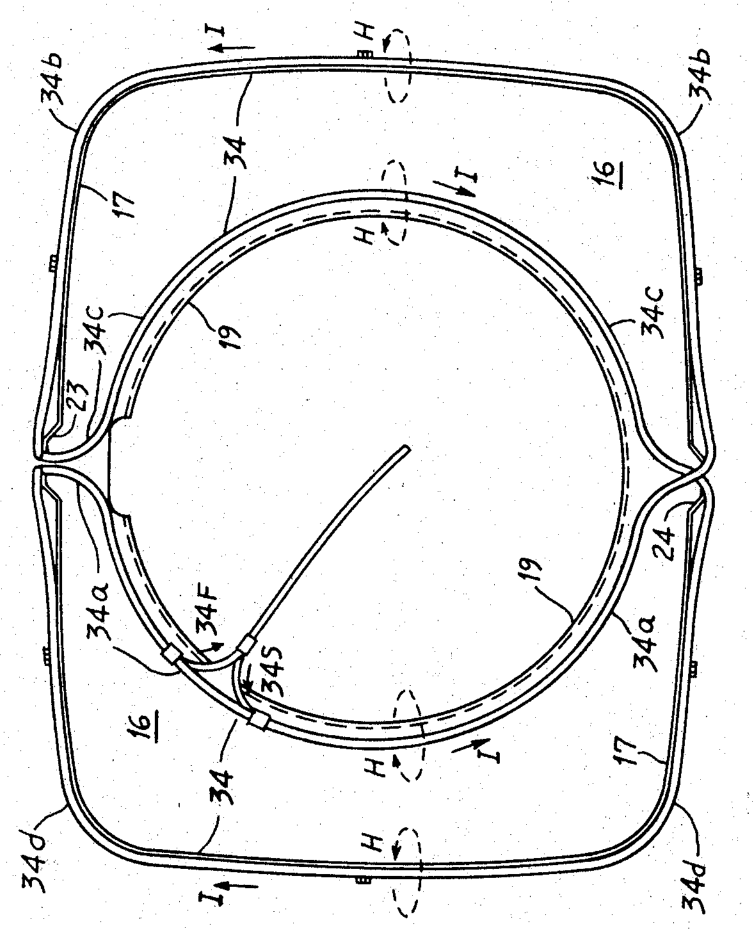
FIGURE 5 is a front view of such apparatus embodying an alternative form of coil structure.

FIGURE 5 is a front view of another form of color purity correcting apparatus embodying the invention with a modified form of coil structure. The shield 16 is similar to that previously described. The coil 34, however, is a unitary structure which needs only to be assembled with the shield and does not require any interconnections between the two sections thereof as in the form of coil structure shown in FIGURES 1, 2 and 3. The unitary coil 34 has two sections respectively encircling the shield 16 effectively in the same manner as that shown and described for the two-part coil structure.

The coil configuration shown in FIGURE 5 may be described, for example, as beginning with a start conductor 34S connected to one terminal of an external alternating current source (not shown). The start conductor 34S becomes the first of a plurality of turns of the left rear section 34a of the coil 34 which encircles the frusto-conical section of the picture tube 11 on the left inside of the shield 16 (as viewed in FIGURE 5) in the direction indicated by the current-representative arrow I, emerging from the bottom shield channel 24 at the front of the apparatus. The right front section 34b of the coil 34 then extends from bottom to top around the right-hand front section 17 of the shield 16 in the direction of the arrow I, entering the top shield channel 23 of the front of the apparatus. The right rear section 34c of the coil 34 then encircles the frusto-conical picture tube section on the right inside of the shield 16 in the direction of the arrow I emerging from the bottom shield channel 24 at the front of the apparatus. At this point it crosses the coil section 34a and becomes the left front coil section 34d which extends from bottom to top around the left-hand front section 17 of the shield 16 in the direction of the arrow I, entering the top shield channel 23 at the front of the apparatus. At this point it becomes the left rear section 34*a* of the coil 34. The encirclement of the shield 16 by the coil 34 is continued in the manner described through a plurality (e.g., 75 to 100) of similar convolutions, culminating in a finish conductor 34F which is connected to the other terminal of the external alternating current source, thereby completing the coil-energizing circuit.

It will be noted that the arrangement of the various coil sections relative to the different shield sections is identical to that described with reference to FIGURES 1, 2 and 3. Also, the unitary coil 34 has current flowing in the different coil sections identically to the current flowing in the corresponding sections of the coils 21 and 22 of FIGURES 1, 2 and 3. Such current flow produces the same flux patterns indicated by the broken line arrows H as in the two-coil arrangement of FIGURES 1, 2 and 3.

The energization of the unitary coil 34 of FIGURE 5 is effected by the circuit of FIGURE 4 in which the two coils 21 and 22 would be replaced by the single coil 34.

The primary purpose in deforming the top and bottom portions of the shield 16 to produce the described channels 23 and 24 is to provide clearance for the coils 21, 22 and 34 in their passage between the inside of the front shield section 17 and the large end 13 of the picture tube 11. An alternative shield configuration, which is within the purview of the present invention, does not require any deformation of the shield material. Instead, cutouts may be made in the front section 17 of the shield at the shown and described locations of the channels 23 and 24. Such cutouts will extend far enough toward the rear of the shield to enable the coils to enter the shield without being curved as shown in FIGURE 1. At such points there is the needed spacing between the shield 16 and the tube 11 to enable the coils to pass toward the rear as previously described.

The coils 21 and 22 of FIGURES 1, 2 and 3 and the coil 34 of FIGURE 5 are shown as being partly on the outside and partly on the inside of the shield 16. While such an arrangement enables the production of good results by the apparatus, other arrangements such as the coils being mounted entirely inside or entirely outside may be made without departing from the principles of this invention.

In order that the shield 16 may have maximum effectiveness it is necessary that there be produced within the shield the strongest magnetic field possible in opposition to the extraneous magnetizing influence, such as the earth's magnetic field, for example. It has been found that such a magnetization of the shield can be effected by producing during the degaussing operation an alternating flux pattern which is parallel to the extraneous field. Such a flux pattern, as indicated in the drawings, is produced by the described apparatus embodying this invention. After the degaussing operation, therefore, the present shield is operative not only against the horizontal component of the earth's magnetic field, for example, regardless of its orientation relative to the television receiver picture tube but also against the vertical component of the earth's magnetic field. As a result, the television receiver embodying such apparatus may be moved to different viewing positions without adversely affecting the performance insofar as color purity is concerned. Suppose that, after operating the receiver in one position and being left in a suitable magnetic state resulting from the operation of the described circuit, it is desired to reorient the receiver. The next time that the set is placed into operation in the new location, the demagnetizing apparatus embodying the invention is effective to leave the shield 16 and other metallic structures in such a state of magnetization as to effectively counteract the new influences to which it is subjected.

What is claimed is:

1. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a shield of permeable material enveloping said large tube end and at least a portion of said frusto-conical tube section;

and coil means extending at the front around said large tube end and extending rearwardly toward said small tube end around said frusto-conical tube section.

2. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a shield of permeable material enveloping said large tube end and extending rearwardly toward said small tube end; and a pair of coils mounted respectively on opposite sides of said frusto-conical tube section, each of said coils including a plurality of turns of conductors, and each coil having a portion extending at the front part way around said large tube end and another portion extending rearwardly toward said small tube end around said frusto-conical tube section.

3. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a shield of permeable material enveloping said large tube end and extending rearwardly toward said small tube end; and a single coil having two sections mounted respectively on opposite sides of said frusto-conical tube section, said coil having a portion extending at the front part way around said large tube end and another portion extending rearwardly toward said small tube end around said frusto-conical tube section.

4. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a frusto-conical shield of permeable material enveloping said large tube end and extending for a substantial distance rearwardly toward said small tube end; and a pair of coils mounted respectively on opposite sides of said frusto-conical tube section, each of said coils including a plurality of turns of bunched conductors, and each coil extending substantially half way around said large tube end on the outside of said shield and extending rearwardly toward said small tube end on the inside of said shield.

5. Color purity correcting apparatus for a multi-color television picture tube having a relatively large end housing a viewing screen and a relatively small end housing electron gun means, said tube ends being joined by means including a frusto-conical section, said apparatus being adapted to be energized periodically by alternating current of a magnitude which initially is appreciable and which diminishes effectively to zero, comprising in combination:

a frusto-conical shield of permeable material enveloping the viewing screen end of said tube and extending for a substantial distance rearwardly toward the electron gun end of said tube; and a pair of coils mounted respectively on opposite sides of said frusto-conical tube section, each of said coils including a plurality of turns of bunched conductors, and each coil extending substantially half way around the viewing screen end of said tube and extending rearwardly toward the electron gun end of said tube around said frusto-conical tube section.

6. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a shield of permeable material enveloping said large tube end and at least a portion of said frusto-conical tube section;

a pair of coils mounted respectively on opposite sides of said frusto-conical tube section, each coil having a first portion extending substantially half way around said large tube end and a second portion extending rearwardly toward said small tube end around said frusto-conical tube section;

and means connecting said coils in such a manner that, at a given instant, current flow in both of said respective first coil portions is from bottom to top.

7. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a shield of permeable material enveloping said large tube end and at least a portion of said frusto-conical tube section; and a single coil having two sections mounted respectively on opposite sides of said frusto-conical tube section, each section of said coil having a first portion extending substantially half way around said large tube end and a second portion extending rearwardly toward said small tube end around said frusto-conical tube sections;

said coil being disposed relative to said tube in such a manner that, at a given instant, current flow in both of said respective first coil portions is from bottom to top.

8. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a generally frusto-conical shield of permeable material having a substantially rectangular configuration at its forward end enveloping said large tube end and a substantially circular configuration at its rear end enveloping at least a portion of said frusto-conical tube section; and a single coil having two sections mounted respectively on opposite sides of said tube, each section of said coil having a substantially semi-rectangular front section extending approximately half way around said large tube end and another section extending rearwardly toward said small tube end around said frusto-conical tube section, said coil being mounted on said shield in such a manner that, at a given instant, current flow in both of said respective front sections is from bottom to top.

9. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a generally frusto-conical shield of permeable material having a substantially rectangular configuration at its forward end enveloping said large tube end and a substantially circular configuration at its rear end enveloping at least a portion of said frusto-conical tube section;

a pair of coils mounted respectively on opposite sides of said tube, each coil having a substantially semi-rectangular front section extending approximately half way around said large tube end on the outside of said shield and another section extending rearwardly toward said small tube end on the inside of said shield;

and means connecting said coils in series so that, at a given instant, current flow in both of said respective front sections is from bottom to top.

10. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a generally frusto-conical shield of permeable material having a substantially rectangular configuration at its forward end enveloping said large tube end and a substantially circular configuration at its rear end enveloping at least a portion of said frusto-conical tube section, the forward end of said shield being deformed outwardly from said substantially rectangular configuration at the center of the top and bottom portions thereof to provide respective channels on the inside of said shield opening at their forward ends to the outside of said shield;

and a pair of coils mounted respectively on opposite sides of said tube;

each coil having a substantially semi-rectangular front section extending approximately half way around said large tube end on the outside of said shield and another section extending through said channels rearwardly toward said small tube end on the inside of said shield.

11. Color purity correcting apparatus for a multi-color television picture tube having a relatively large end housing a viewing screen and a relatively small end housing electron gun means, said tube ends being joined by means including a frusto-conical section, said apparatus being adapted for energization periodically by alternating current of a magnitude which initially is appreciable and which diminishes effectively to zero, comprising in combination:

a generally frusto-conical shield of permeable material having a substantially rectangular configuration at its forward end enveloping said large tube end and a substantially circular configuration at its rear end enveloping at least a portion of said frusto-conical tube section, the forward end of said shield being deformed outwardly from said substantially rectangular configuration at the center of the top and bottom portions thereof to provide respective channels on the inside of said shield opening at their forward ends to the outside of said shield;

and a single continuous coil having two sections mounted respectively on opposite sides of said tube, each section of said coil having a substantially semi-rectangular first section extending approximately half way around said large tube end on the outside of said shield and a second section extending through said channels rearwardly toward said small tube end on the inside of said shield, the second sections of said coil paralleling one another in one of said channels and crossing one another in the other of said channels.

References Cited

UNITED STATES PATENTS

| | | | |
|---|---|---|---|
| 2,898,509 | 8/1959 | Clay et al. | 315—8 |
| 2,925,524 | 2/1960 | Heil | 315—8 |
| 3,018,401 | 1/1962 | Stanley | 313—85 |
| 3,249,795 | 3/1966 | Dietch | 315—8 |

JAMES W. LAWRENCE, *Primary Examiner.*

V. LAFRANCHI, *Assistant Examiner.*